United States Patent Office 3,267,092
Patented August 16, 1966

3,267,092
CERTAIN DIHYDRO-2H-AZEPINE COMPOUNDS
AND THEIR PREPARATION
Leo A. Paquette, Portage Township, Kalamazoo County, Mich., assignor to The Upjohn Company, Kalamazoo, Mich., a corporation of Delaware
No Drawing. Original application May 24, 1963, Ser. No. 282,883. Divided and this application Nov. 4, 1965, Ser. No. 514,162
5 Claims. (Cl. 260—239)

This is a division of application Serial No. 282,883, filed May 24, 1963.

This invention relates to novel compositions of matter and to methods for their preparation. In particular, this invention relates to novel dialkyl 2-azabicyclo[3.2.2]nona-6,8-diene-8,9-dicarboxylates of the formula:

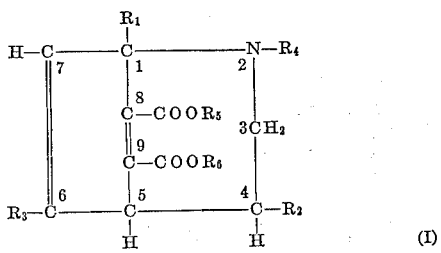

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, and wherein $R_5$ and $R_6$ are alkyl of 1 to 6 carbon atoms, inclusive. $R_1$ and $R_2$ can be the same or different. When $R_3$ is alkyl, it can be the same as or different than $R_1$ or $R_2$. When $R_4$ is alkyl, it can be the same as or different than $R_1$, $R_2$, or $R_3$. $R_5$ and $R_6$ can be the same or different, and either or both can be the same as or different than $R_1$, $R_2$, $R_3$, or $R_4$.

Examples of alkyl of 1 to 4 carbon atoms, inclusive, are methyl, ethyl, propyl, butyl, and isomeric forms thereof. Examples of alkyl of 1 to 6 carbon atoms, inclusive, are methyl, ethyl, propyl, butyl, pentyl, hexyl, and isomeric forms thereof. Examples of alkenyl of 3 to 6 carbon atoms, inclusive, are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, and the like. Examples of alkynyl of 3 to 6 carbon atoms, inclusive, are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentynyl, 3-hexynyl, and the like. Examples of cycloalkyl of 5 to 10 carbon atoms, inclusive, are cyclopentyl, cyclohexyl, 2-methylcyclopentyl, 2-methylcyclohexyl, 3-methylcyclohexyl, 4-methylcyclohexyl, 2-ethylcyclopentyl, 3-ethylcyclohexyl, 4-ethylcyclohexyl, 2-propylcyclopentyl, 3-isopropylcyclopentyl, 4-propylcyclohexyl, 2,3-dimethylcyclohexyl, 2-methyl-4-ethylcyclohexyl, cycloheptyl, 3-ethylcycloheptyl, cyclooctyl, 4-tert-butylcyclohexyl, 2,3-dimethylcyclooctyl, cyclononyl, cyclodecyl, and the like. Examples of aralkyl of 7 to 11 carbon atoms, inclusive, are benzyl, phenethyl, 2-phenylpropyl, 3-phenylpropyl, 4-phenylbutyl, 1-naphthylmethyl, 2-naphthylmethyl, and the like.

The novel dialkyl 2-azabicyclo[3.2.2]nona-6,8-diene-8,9-dicarboxylates of Formula I are amines and exist either in the nonprotonated (free base) form or the protonated (acid addition salt) form depending upon the pH of the environment. They form stable protonates, i.e., acid addition salts, on neutralization with suitable acids, for example, hydrochloric hydrobromic, sulfuric, phosphoric, nitric, acetic, benzoic, salicyclic, glycolic, succinic, nicotinic, tartaric, maleic, malic, pamoic, methanesulfonic, cyclohexanesulfamic, picric and lactic acids, and the like. These acid addition salts are useful for upgrading the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel bicyclic free bases of Formula I form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I compounds of this invention also form salts with penicillins. These salts have solubility characteristics which cause them to be useful in the isolation and purification of penicillins, particularly benzyl penicillin. Said salts can be formed either by neutralization of the free base form a compound of Formula I with the free acid form of a penicillin, or by a metathetical exchange of the anion of an acid addition salt of a compound of Formula I, for example, the chloride ion of a hydrochloride, with the anionic form of a penicillin.

The novel bicyclic amines of Formula I, particularly wherein $R_4$ is as defined above but not hydrogen, are useful as catalysts for reactions between isocyanates and active hydrogen compounds, e.g., alcohols and amines, and are especially useful as catalysts for the formation of polyurethanes, e.g., polyurethane foams, by interaction of polyisocyanates and polyhydroxy compounds.

The compounds of Formula I exhibit central nervous system stimulatory activity and therefore are useful in animals as antidepressants and to improve alertness. These compounds also inhibit the action of Newcastle disease virus on chick embryo cells.

The novel dialkyl 2-azabicyclo[3.2.2]nona-6,8-diene-8,9-dicarboxylates of Formula I are prepared by reacting a 1,3-dihydro-2H-azepine of the formula:

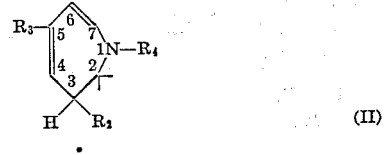

wherein $R_1$, $R_2$, $R_3$, and $R_4$ are as given above with a dialkyl acetylenedicarboxylate of the formula

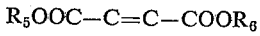

$$R_5OOC-C\equiv C-COOR_6$$

wherein $R_5$ and $R_6$ are as given above.

Dialkyl acetylenedicarboxylates of the above formula are either known in the art or can be prepared by methods known in the art [e.g., Rodd, "Chemistry of Carbon Compounds," Elsevier Publishing Company, Amsterdam, vol. 1B, p. 1010 (1952)].

1,3-dihydro-2H-azepines of Formula II are novel in the art. They can be prepared by reacting the corresponding 1,3-dihydro-2H-azepin-2-ones with lithium aluminum hydride, and then treating the resulting reaction mixtures with water as a base according to the equation:

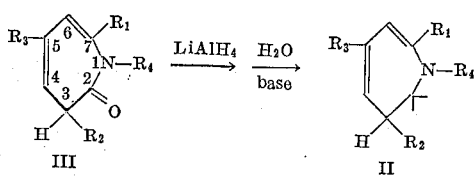

In this equation, $R_1$, $R_2$, $R_3$, and $R_4$ are as given above.

1,3-dihydro-2H-azepin-2-ones of Formula III wherein $R_1$, $R_2$, and $R_3$ are as given above and wherein $R_4$ is hydrogen are either known in the art or can be prepared by the method known in the art, i.e., by interaction of the sodium salt of a di-ortho-substituted phenol with an ethereal solution of chloramide ($ClNH_2$), preferably in the presence of an excess of the phenol [Theilacker et al., Angew. Chem. 72, 131 (1960); ibid., 75, 208–9 (1963)]. Phenols suitable for this reaction are known in the art or can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem. 69, 699–706 (1957)]. Examples of suitable phenols are 2,6-dimethylphenol (2,6 - xylenol), 2,4,6 - trimethylphenol (mesitol), 2,6-diethylphenol, 2,4,6-triethylphenol, 2,6-dipropylphenol, 2,6 - diisopropylphenol, 2,4,6 - triisopropylphenol, 2,6-diisobutylphenol, 2,4,6-tri-tert-butylphenol, 2-ethyl-6-methylphenol, 2-methyl-6-propylphenol, 2-ethyl-6-propylphenol, 2-tert-butyl-6-methylphenol, 2-sec-butyl-6-methylphenol, 2-tert-butyl-6-ethylphenol, 2-tert-butyl-6-isopropylphenol, 2-isobutyl-6-propylphenol, 4-sec-butyl-2,6-dimethylphenol, 4-tert-butyl-2,6-dimethylphenol, 2,4-dimethyl - 6 - ethylphenol, 2,4 - dimethyl - 6 - propylphenol, 6 - tert - butyl - 2,4 - dimethylphenol, 2,6-diethyl - 4 - methylphenol, 2,6 - diisopropyl - 4 - methylphenol, 2,4-di-tert-butyl-6-methylphenol, 2,6-di-tert-butyl-4-ethylphenol, 2,4-di-tert-butyl-6-propylphenol, 2,6-diisobutyl - 4 - propylphenol, 2,6 - di - tert - butyl - 4 - sec-butylphenol, 2-tert-butyl-4-ethyl-6-methylphenol, 2-sec-butyl - 6 - isopropyl - 4 - methylphenol, 2 - butyl - 6 - tert-butyl-4-methylphenol, and the like.

1,3-dihydro-2H-azepin-2-ones of Formula III wherein $R_4$ is as given above but not hydrogen are prepared from the corresponding Formula III 1,3-dihydro-2H-azepin-2-ones wherein $R_4$ is hydrogen by replacing said hydrogen with the appropriate alkyl, alkenyl, alkynyl, cycloalkyl, or aralkyl moiety. This N-substitution is carried out in two steps according to the equation:

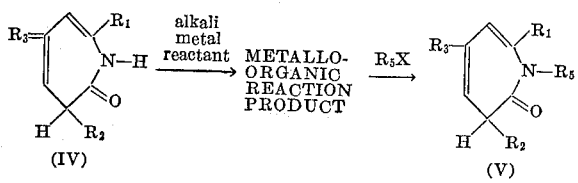

In this equation, $R_1$, $R_2$, and $R_3$ are as given above; the alkali metal reactant is a material selected from the group consisting of alkali metals, alkali metal hydrides, and alkali metal amides; and $R_5X$ is an organic halide wherein X is selected from the group consisting of chloride, bromide, and iodide, and wherein $R_5$ is selected from the group consisting of alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive. It will be noted that this definition of $R_5$ excludes hydrogen but is otherwise the same as the above definition of $R_4$.

For the N-substitution of Formula IV 1,3-dihydro-2H-azepin-2-ones, suitable alkali metal reactants are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methylpyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the organic reactant, i.e., the Formula IV 1,3-dihydro-2H-azepin-2-one.

The alkali metal reactant and the organic reactant are mixed, and the reaction between them is carried out at temperatures which can vary from about 0° to about 150° C., preferably from about 25° to about 100° C. The most suitable temperature will of course depend upon such factors as the reactivities of the alkali metal reactant and the organic reactant, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the organic reactant and the alkali metal reactant, although an excess of either reactant can be used. The time required for completing the reaction will depend on the reaction temperature, the reactivities of the two reactants, and the nature of the solvent. Illustratively, with sodium hydride, the reaction frequently requires about 15 minutes to about 3 hours at temperatures ranging from about 50° to about 100° C.

After the reaction between the alkali metal reactant and the organic reactant is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with the organic halide of the formula $R_5X$, as above defined.

The organic bromides and iodides are preferred for this next step because of their greater reactivity, although the organic chlorides can be used and are advantageous in some instances because they are usually less expensive.

Suitable organic bromides include methyl bromide, ethyl bromide, propyl bromide, isopropyl bromide, butyl bromide, sec-butyl bromide, isobutyl bromide, pentyl bromide, isopentyl bromide, 2-methylbutyl bromide, 1,2-dimethylpropyl bromide, 1-ethylpropyl bromide, 1-methylbutyl bromide, hexyl bromide, isohexyl bromide, 1-methylpentyl bromide, 1-ethylbutyl bromide, 2-methylpentyl bromide, 1,2-dimethylbutyl bromide, allyl bromide, 2-methylallyl bromide, 2-butenyl bromide, 3-butenyl bromide, 1,2-dimethylallyl bromide, 2-ethylallyl bromide, 1-methyl-2-butenyl bromide, 2-methyl-2-butenyl bromide, 3-methyl-2-butenyl bromide, 2,3-dimethyl-2-butenyl bromide, 1,3-dimethyl-2-butenyl bromide, 1-ethyl-2-butenyl bromide, 4-methyl-2-pentenyl bromide, 2-propynyl bromide, 2-butynyl bromide, 1-methyl-2-propynyl bromide, 3-butynyl bromide, 1-methyl-3-butynyl bromide, 3-pentynyl bromide, 4-pentynyl bromide, 3-hexynyl bromide, 2-methyl-3-pentynyl bromide, cyclopentyl bromide, cyclohexyl bromide, 2-methylcyclopentyl bromide, 2-methylcyclohexyl bromide, 3-methylcyclohexyl bromide, 4-methylcyclohexyl bromide, 2-ethylcyclopentyl bromide, 3-ethylcyclopentyl bromide, 4-ethylcyclohexyl bromide, 3-isopropylcyclopentyl bromide, 2,3-dimethylcyclohexyl bromide, cycloheptyl bromide, cyclooctyl bromide, 4-tert-butylcyclohexyl bromide, cyclononyl bromide, cyclodecyl bromide, benzyl bromide, phenethyl bromide, 2-phenylpropyl bromide, 3-phenylpropyl bromide, 4-phenylbutyl bromide, 1 - naphthylmethyl bromide, 2 - naphthylmethyl bromide, and the like. Suitable chlorides and iodides include those corresponding to the above bromides. These halides are either known in the art or can be prepared by methods known in the art, for example, by reaction of the corresponding alcohol with a phosphorus halide, by halogenation of a suitable saturated hydrocarbon, or by addition of a hydrogen halide to a suitable unsaturated hydrocarbon.

The organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture. Although only one molecular equivalent of the organic halide is required for reaction with one molecular equivalent of the metallo-organic reaction product, preferably calculated on the basis of the amount of the organic reactant used to prepare the latter, it is preferred to use an excess of the organic halide, for example, about 1.01 to about 5 or even more molecular equivalents of the halide per molecular equivalent of the metallo-organic reaction product. Particularly preferred is the use of about 1.05 to about 2 molecular equivalents of organic halide per molecular equivalent of metallo-organic reaction product. Suitable reaction times and reaction temperatures for the interaction of organic halide and metallo-organic reaction product depend upon the nature of the reactants and the solvent, and the usual inverse relationship between time and temperature is observed. The organic iodides are the most reactive and the organic chlorides the least reactive. Suitable reaction temperatures range from about 0° to about 200° C., preferably from about 10° to about 75° C. Usually, reaction temperatures ranging from about 25° to about 75° C. and reaction times ranging from about 1 to about 8 hours are satisfactory. The desired N-substituted 1,3-dihydro-2H-azepin-2-one can be isolated from the reaction mixture by conventional methods, for example, by removal of reaction solvent by evaporation or distillation. If any alkali metal halide is present as a solid in the reaction mixture, it may with advantage be removed by filtration before the desired organic reaction product is isolated.

In the reaction of lithium aluminum hydride with 1,3-dihydro-2H-azepin-2-ones, the stoichiometric amounts of reactants correspond to 0.75 mole of lithium aluminum hydride and one mole of a Formula IV 1,3-dihydro-2H-azepin-2-one, and to 0.5 mole of lithium aluminum hydride and one mole of a Formula V 1,3-dihydro-2H-azepin-2-one. However, it is preferred to use an excess of the lithium aluminum hydride, advantageously about 50 to about 300 percent excess. A larger excess can be used but there is little if any advantage in doing so.

The reaction between lithium aluminum hydride and 1,3-dihydro-2H-azepin-2-one is preferably carried out by adding a diethyl ether solution of the latter reactant to a slurry of the lithium aluminum hydride in diethyl ether, and then refluxing the resultant reaction mixture for about one to about 10 hours, the optimum time being dependent on the nature of the organic reactant. It is important to exclude oxygen from the reaction mixture. This can be accomplished by passing a slow stream of an inert gas, for example, nitrogen or helium, through the reaction vessel during the reflux period. It is also important to exclude substantial amounts of moisture from the reaction mixture. The use of dry solvents, reactants, and reaction vessels is preferred.

The first step in the isolation of the desired reaction product from the final lithium aluminum hydride reaction mixture involves addition of water and a base, preferably an alkali metal hydroxide such as sodium hydroxide, to the reaction mixture. 1,3-dihydro-2H-azepines tend to decompose in the presence of substantial amounts of water, and it is preferred generally to use the minimum amount of water for this step. It is usually preferred to cool the final reaction mixture externally with ice, and then to add with stirring successively about 1 ml. of water, about 1 ml. of 25 percent aqueous sodium hydroxide solution, and about 3 ml. of water for each gram of lithium aluminum hydride originally used in the reaction mixture. When these amounts of water and sodium hydroxide solution are used, the aluminate salts usually precipitate in the form of a granular solid with no separate aqueous phase. This solid precipitate is readily separated from the organic solution by filtration or centrifugation. The free base form of the desired organic product can then be isolated by evaporation of the solvent.

1,3-dihydro-2H-azepines of Formula II wherein $R_4$ is as given above but not hydrogen are usually liquids, and usually can be purified by distillation at reduced pressure. 1,3-dihydro-2H-azepines of Formula II wherein $R_4$ is hydrogen are usually solids, and can be purified by recrystallization or precipitation from a suitable solvent or mixture of solvents. Alternative methods of purification for either type of 1,3-dihydro-2H-azepine are partition between the phases of a non-aqueous two-phase solvent system or chromatography. Frequently, however, the lithium aluminum hydride reaction produces 1,3-dihydro-2H-azepines of sufficient purity that a purification step is unnecessary before subsequent reaction with the dialkyl acetylenedicarboxylate. Indeed, the novel 1,3-dihydro-2H-azepine intermediates of this invention tend to be less stable to air and moisture than other organic compounds, and it is usually advantageous to prepare them shortly before transformation to the desired dialkyl 2-azabicyclo[3.2.2]nona-6,8-diene-8,9-dicarboxylates of Formula I, and to minimize exposure to air and moisture.

The novel Formula II 1,3-dihydro-2H-azepines are basic compounds and can be transformed into salts by reaction with strong acids. This reaction is thought to proceed according to the equation:

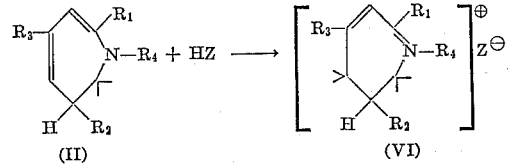

In this equation, $R_1$, $R_2$, $R_3$, and $R_4$ are as given above, HZ symbolizes a strong acid, and $Z^\ominus$ symbolizes the anion of the strong acid. By the term "strong acid" is meant any acid with a dissociation constant at least $10^{-2}$ in water solution at about 25° C. Acids with a dissociation constant at least $10^{-1}$ are preferred. It is to be understood that the strong acid may have more than one hydrogen with a dissociation constant at least $10^{-2}$, e.g., sulfuric acid, and therefore the symbol $Z^{\ominus}$ is to be construed as including anions with electrical charge greater than one, e.g., sulfate ion. In this last situation, of course, more than one of the organic cyclic cations shown in Formula VI will be associated with each multi-charged anion. Although the cation in Formula VI is thought to have the arrangement of single and double bonds shown, some or all of the cations in a particular salt may have another electronic configuration. The exact structure of the salt cation is of no consequence in the preparation and use of the Formula VI salts, and the structure shown in Formula VI is to be construed as including other electronic configurations.

Examples of strong acids which can be used to form salts of Formula VI are perchloric acid, hydrochloric acid, hydriodic acid, sulfuric acid, trichloroacetic acid, picric acid, and the like. The salts are prepared by mixing equivalent amounts of the 1,3-dihydro-2H-azepine and the acid. It is preferred to dissolve the 1,3-dihydro-2H-azepine in a relatively non-polar solvent, e.g., diethyl ether, and then to add a solution of the acid in a similar solvent or a somewhat more polar solvent, e.g., ethanol or a mixture of ethanol and diethyl ether. Because the 1,3-dihydro-2H-azepine free bases tend to be decomposed by water, large amounts of water should not be present during the salt-forming reaction, although small amounts of water will not be detrimental. For example, 70 percent aqueous perchloric acid or 45 to 60 percent aqueous hydriodic acid can be used as the source of the strong acid, dissolving the appropriate amounts of such a concentrated aqueous acid in the organic solvent before admixture with the 1,3-dihydro-2H-azepine solution. One Formula VI salt can be transformed to another by a metathetical exchange of anions. For example, a Formula VI salt wherein $Z^{\ominus}$ is the perchlorate ion can be transformed to the corresponding salt wherein $Z^{\ominus}$ is iodide by mixing an acetone solution of the perchlorate salt with another iodide salt, for example, potassium iodide. Potassium perchlorate precipitates from the solution and the iodide salt can be isolated by evaporation of the acetone.

The salts of Formula VI are usually stable solids and usually can be purified readily by recrystallization from a solvent or mixture of solvents. For this reason, these salts are useful to characterize, i.e., to verify the identity of, a Formula II 1,3-dihydro-2H-azepine, especially when the 1,3-dihydro-2H-azepine free base is difficult to purify without decomposition. Moreover, these salts of Formula VI can be transformed back to the corresponding free base form of the 1,3-dihydro-2H-azepine, for example, by reaction with moist silver oxide, moist sodium carbonate, or moist potassium carbonate, in the presence of an inert low-boiling solvent, e.g., diethyl ether, followed by filtration and evaporation of the ether. Therefore these salts are useful to purify the unstable free bases and to preserve the latter in a stable form until needed for further transformation to the dialkyl 2-azabicyclo-[3.2.2]nona-6,8-diene-8,9-dicarboxylates of Formula I. The perchlorate salts are especially preferred for these uses.

The reaction between the dialkyl acetylenedicarboxylate and the 1,3-dihydro-2H-azepine of Formula II is carried out by mixing these two reactants. Ordinarily, it is preferred to react approximately equimolecular amounts of the two reactants to avoid the necessity of subsequent separation of the excess reactant from the desired adduct of Formula I. However, an excess of either reactant can be used, for example, about 1.1 to about 3 or even more molecular equivalents of one reactant per molecular equivalent of the other reactant, and in some cases, such an excess is advantageous, especially when the reaction is slow and the yield of desired product relatively small when equimolecular amounts of reactants are used. Usually, however, the reaction rate and yield of adduct are high enough so that there is no advantage in using an excess of either reactant. Although it is not essential to use a reaction solvent, especially when the Formula II reactant is a liquid within the preferred reaction temperature range, it is preferred that a solvent be present in the reaction mixture. Suitable solvents include normally liquid aromatic hydrocarbons, e.g., benzene, toluene, xylene, and cumene; ethers, e.g., diethyl ether, tetrahydrofuran, and dioxane; ketones, e.g., acetone, methyl ethyl ketone, and diethyl ketone; and such solvents as chlorobenzene, tetrahydronaphthalene, and cyclohexane. The criteria for a solvent are that both reactants be moderately soluble therein and that the solvent not react with either reactant.

The reaction between dialkyl acetylenedicarboxylate and the Formula II compound is usually exothermic. It is preferred to add a solution of the Formula II compound rapidly to a solution of the dialkyl acetylenedicarboxylate, keeping the resulting mixture in the range about 10° to about 35° C. with external cooling if necessary. After the addition is complete, the mixture is allowed to stand or is stirred in the range about 0° to about 100° C. until the desired reaction is complete. Usually the reaction proceeds at a satisfactory rate in the range about 10° to about 50° C. At lower temperatures, the reaction rate tends to be inconveniently slow. At higher temperatures, the yield of the desired Formula I compound tends to be lower than within the preferred reaction temperature range.

The time required for completion of the reaction will vary according to such factors as the reactivities of the two reactants, the reaction temperature, and the nature of the reaction solvent. The usual inverse relationship between reaction time and reaction temperature is observed. At about 25° C., the reaction usually requires from about one-half to about 36 hours.

After the reaction between dialkyl acetylenedicarboxylate and the Formula II reactant is complete, the Formula I product can be isolated by conventional techniques, for example, by evaporation of the solvent under reduced pressure. The Formula I products are usually solids at normal temperature and can be purified by recrystallization from a suitable solvent or mixture of solvents, by chromatography, or by a combination of these methods.

The free base form of a Formula I dialkyl 2-azabicyclo-[3.2.2]nona-6,8-diene-8,9-dicarboxylate is produced by the above reaction between dialkyl acetylenedicarboxylate and 1,3-dihydro-2H-azepine. This free base can be transformed to an acid addition salt by neutralization with the appropriate amount of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I amine, the acid, and the acid addition salt. If the acid is soluble in water, the basic compound of Formula I can be dissolved in water containing an equivalent amount of the acid, and thereafter, the water can be removed by evaporation. If the acid is soluble in a relatively non-polar solvent, for example, diethyl ether or diisopropyl ether, separate solutions of the acid and the Formula I compound in such a solvent can be mixed in equivalent amounts, whereupon the acid addition salt will usually precipitate because of its relatively low solubility in the non-polar solvent. Alternatively, the basic Formula I compound can be mixed with an equivalent amount of the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. The acid addition salt is usually a solid and can be purified by recrystallization from a suitable solvent or mixture of solvents. The acid addition salt can be transformed back to the free base by treatment with a base, e.g., sodium hydroxide.

The invention can be more fully understood by the following examples.

*Example 1.—1,3-dihydro-3,5,7-trimethyl-2H-azepin-2-one*

Following the procedure of Theilacker et al., supra, the sodium salt of 2,4,6-trimethylphenol was reacted with chloramide in the presence of an excess of this phenol. 1,3-dihydro-3,5,7-trimethyl-2H-azepin-2-one was obtained; M.P. 132° C.

Following the procedure of Example 1 but substituting for the 2,4,6-trimethylphenol;
2,6-dimethylphenol;
2,6-diethylphenol;
2,6-dipropylphenol;
2,6-diisopropylphenol;
2,6-diisobutylphenol;
2,6-dibutylphenol;
2,4,6-triethylphenol;
2,6-diethyl-4-methylphenol;
2,6-dimethyl-4-ethylphenol;
4-tert-butyl-2,6-dimethylphenol;
2,6-diisopropyl-4-methylphenol;
2,6-diisobutyl-4-propylphenol;
4-sec-butyl-2,6-dimethylphenol; and
2,4,6-triisopropylphenol, there are obtained 1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,7-dibutyl-2H-azepin-2-one;
1,3-dihydro-3,5,7-triethyl-2H-azepin-2-one;
1,5-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-propyl-2H-azepin-2-one;
1,3-dihydro-5-sec-butyl-3,7-dimethyl-2H-azepin-2-one; and
1,3-dihydro-3,5,7-triisopropyl-2H-azepin-2-one,
respectively.

*Example 2.—1,3-dihydro-1,3,5,7,-tetramethyl-2H-azepin-2-one*

A 51.5% sodium hydride suspension in mineral oil (9.0 g.; equivalent to 0.19 mole of sodium hydride) was added to a solution of 1,3-dihydro-3,5,7-trimethyl-2H-azepin-2-one (29.0 g.; 0.19 mole) in 150 ml. of dimethylformamide. The mixture was stirred at 50° C. for 1 hour. After cooling, methyl iodide (42.6 g.; 0.30 mole) was added in two portions. After stirring for 1 hour, 250 ml. of diethyl ether was added and the resulting slurry was filtered. The oil remaining after evaporation of the solvent in the filtrate was distilled to yield 29.45 g. of a colorless liquid; B.P. 115–120° C. at 11 mm. Redistillation gave 1,3-dihydro-1,3,5,7-tetramethyl-2H-azepin-2-one; B.P. 121.5° C. at 13 mm.; $n_D^{24}$ 1.5198.

*Analysis.*—Calcd. for $C_{10}H_{15}NO$: C, 72.69; H, 9.15; N, 8.48. Found: C, 72.32; H, 9.26; N, 8.59.

Following the procedure of Example 2 but substituting for the methyl iodide, isopropyl chloride; propyl iodide; isobutyl bromide; pentyl bromide; hexyl chloride; allyl bromide; 2-methyl-2-butenyl bromide; 4-methyl-2-pentenyl chloride; 2-propynyl bromide; 3-pentynyl chloride; cyclopentyl chloride; cyclohexyl bromide; 4-tert-butylcyclohexyl chloride; benzyl bromide; and 1-naphthylmethyl chloride, there are obtained 1,3-dihydro-1-isopropyl-3,5,7-trimethyl-2H-azepin-2-one;
1,3-dihydro-1-propyl-3,5,7-trimethyl-2H-azepin-2-one;
1,3-dihydro-1-isobutyl-3,5,7-trimethyl-2H-azepin-2-one;
1,3-dihydro-1-pentyl-3,5,7-trimethyl-2H-azepin-2-one;
1,3-dihydro-1-hexyl-3,5,7-trimethyl-2H-azepin-2-one;
1,3-dihydro-1-allyl-3,5,7-trimethyl-2H-azepin-2-one;
1,3-dihydro-1-(2-methyl-2-butenyl)-3,5,7-trimethyl-2H-azepin-2-one;
1,3-dihydro-1-(4-methyl-2-pentenyl)-3,5,7-trimethyl-2H-azepin-2-one;
1,3-dihydro-1-(2-propynyl)-3,5,7-trimethyl-2H-azepin-2-one;
1,3-dihydro-1-(3-pentynyl)-3,5,7-trimethyl-2H-azepin-2-one;
1,3-dihydro-1-cyclopentyl-3,5,7-trimethyl-2H-azepin-2-one;
1,3-dihydro-1-cyclohexyl-3,5,7-trimethyl-2H-azepin-2-one;
1,3-dihydro-1-(4-tert-butylcyclohexyl)-3,5,7-trimethyl-2H-azepin-2-one;
1,3-dihydro-1-benzyl-3,5,7-trimethyl-2H-azepin-2-one;
and 1,3-dihydro-1-(1-naphthylmethyl)-3,5,7-trimethyl-2H-azepin-2-one, respectively.

Following the procedure of Example 2 but substituting for the combination of 1,3-dihydro-3,5,7-trimethyl-2H-azepin-2-one and methyl iodide as reactants, 1,3-dihydro-3,7-dimethyl-2H-azepin-2-one plus isopropyl chloride; 1,3-dihydro-3,7-dimethyl-2H-azepin-2-one plus cyclopentyl chloride; 1,3-dihydro-3,7-diethyl-2H-azepin-2-one plus benzyl bromide; 1,3-dihydro-3,7-diethyl-2H-azepin-2-one plus allyl bromide; 1,3-dihydro-3,7-dipropyl-2H-azepin-2-one plus propyl iodide; 1,3-dihydro-3,7-diisopropyl-2H-azepin-2-one plus 4-tert-butylcyclohexyl chloride; 1,3-dihydro-3,7-diisobutyl-2H-azepin-2-one plus propyl bromide; 1,3-dihydro-3,7-dibutyl-2H-azepin-2-one plus pentyl bromide; 1,3-dihydro-3,5,7-triethyl-2H-azepin-2-one plus 2-propynyl bromide; 1,3-dihydro-3,7-diethyl-5-methyl-2H-azepin-2-one plus benzyl bromide; 1,3-dihydro-3,7-dimethyl-5-ethyl-2H-azepin-2-one plus hexyl chloride; 1,3-dihydro-5-tert-butyl-3,7-dimethyl-2H-azepin-2-one plus 1-naphthylmethyl chloride; 1,3-dihydro-3,7-diisopropyl-5-methyl-2H-azepin-2-one plus allyl bromide; 1,3-dihydro-3,7-diisobutyl-5-propyl-2H-azepin-2-one plus propyl iodide; 1,3-dihydro-5-sec-butyl-3,7-dimethyl-2H-azepin-2-one plus 2-propynyl bromide; and 1,3-dihydro-3,5,7-triisopropyl-2H-azepin-2-one plus isopropyl chloride, there are obtained 1,3-dihydro-3,7-dimethyl-1-isopropyl-2H-azepin-2-one; 1,3-dihydro-1-cyclopentyl-3,7-dimethyl-2H-azepin-2-one; 1,3-dihydro-1-benzyl-3,7-diethyl-2H-azepin-2-one; 1,3-dihydro-1-allyl-3,7-diethyl-2H-azepin-2-one; 1,3-dihydro-1,3,7-tripropyl-2H-azepin-2-one; 1,3-dihydro-1 - (4 - tert - butylcyclohexyl) - 3,7 - diisopropyl - 2H-azepin-2-one; 1,3-dihydro-3,7-diisobutyl-1-propyl-2H-azepin-2-one; 1,3 - dihydro - 3,7 - dibutyl - 1 - pentyl - 2H-azepin - 2 - one; 1,3 - dihydro - 1 - (2 - propynyl) - 3,5,7-triethyl - 2H - azepin - 2 - one; 1,3 - dihydro - 1 - benzyl-3,7 - diethyl - 5 - methyl - 2H - azepin - 2 - one; 1,3-dihydro - 3,7 - dimethyl - 5 - ethyl - 1 - hexyl - 2H - azepin-2 - one; 1,3 - dihydro - 5 - tert - butyl - 3,7 - dimethyl-1-(1-naphthylmethyl)-2H-azepin-2-one; 1,3-dihydro-1-allyl - 3,7 - diisopropyl - 5 - methyl - 2H - azepin - 2-one; 1,3 - dihydro - 3,7 - diisobutyl - 1,5 - dipropyl - 2H-azepin - 2 - one; 1,3 - dihydro - 5 - sec - butyl - 3,7-dimethyl - 1 - (2 - propynyl) - 2H - azepin - 2 - one; and 1,3 - dihydro - 1,3,5,7 - tetraisopropyl - 2H - azepin - 2-one, respectively.

Example 3.—1,3-dihydro-1,3,5,7-tetramethyl-2H-azepine 1,3 - dihydro - 1,3,5,7 - tetramethyl - 2H - azepin - 2-one (33.0 g.; 0.20 mole) was added in four portions to a stirred slurry of lithium aluminum hydride (7.6 g.; 0.20 mole) in 200 ml. of anhydrous diethyl ether at about 25° C. during 10 minutes. The resulting mixture was refluxed with stirring for 3 hours while a slow stream of nitrogen gas was passed into the reaction flask. The reaction mixture was then cooled externally with ice and, with continued stirring, 8 ml. of water, 8 ml. of 25% aqueous sodium hydroxide solution, and 23 ml. of water were added in that order. Stirring was continued for about 5 minutes. The granular precipitate of inorganic salts was then removed by filtration, and the filtrate was evaporated to give a pale yellow oil which was distilled under reduced pressure to give 27.7 g. of 1,3-dihydro-1,3,5,7-tetramethyl-2H-azepine in the form of a colorless liquid which rapidly turned yellow; B.P. 50–54° C. at 1.0 mm.

U.V. (diethyl ether)—301 m$\mu$ ($\epsilon$=7,050).

I.R. (principal bands; CCl$_4$ solution)—1635 and 1595 cm.$^{-1}$.

A solution containing equal volumes of 70 percent aqueous perchloric acid and absolute ethanol was added dropwise to a solution of about 5 g. of 1,3-dihydro-1,3,5,7-tetramethyl-2H-azepine in 50 ml. of diethyl ether until the mixture changed Congo red paper to a blue color. A crystalline solid started to form when the inner walls of the glass reaction vessel were rubbed with a glass rod. After cooling at about 5° C., the solid was filtered and recrystallized from a mixture of acetone and diethyl ether to give the perchloric acid salt of 1,3-dihydro-1,3,5,7-tetramethyl-2H-azepine, presumed to be 3,4-dihydro-1,3,5,7-tetramethyl-2H-azepinium perchlorate, in the form of white prisms; M.P. 106–106.5° C.

Analysis.—Calcd. for C$_{10}$H$_{18}$ClNO$_4$: C, 47.71; H, 7.21; N, 5.56. Found: C, 47.46; H, 7.25; N, 5.35.

U.V. (absolute ethanol)—272 m$\mu$ ($\epsilon$=4,950).

I.R. (principal bands; mineral oil mull)—1680 and 1605 cm.$^{-1}$.

Using in place of perchloric acid, hydrochloric acid; hydriodic acid; sulfuric acid; trichloroacetic acid; and picric acid, there are obtained the corresponding hydrochloric; hydriodic; sulfuric; trichloroacetic; and picric acid addition salts, respectively, of 1,3-dihydro-1,3,5,7-tetramethyl-2H-azepine.

Example 4.—1,3-dihydro-1-ethyl-3,5,7-trimethyl-2H-azepine

Following the procedure of Example 3, 1,3-dihydro-1-ethyl-3,5,7-trimethyl-2H-azepin - 2 - one (7.7 g.; 0.043 mole) was reacted with lithium aluminum hydride (1.6 g.; 0.043 mole) to give 5.6 g. of 1,3-dihydro-1-ethyl-3,5,7-trimethyl-2H-azepine in the form of a colorless liquid which slowly turned yellow; B.P. 61–64° C. at 1 mm.; n$_D^{23}$ 1.5176.

U.V. (diethyl ether)—305 m$\mu$ ($\epsilon$=7,500).

I.R. (principal bands; CCl$_4$ solution)—1635 and 1585 cm.$^{-1}$.

Also following the procedure of Example 3, 1,3-dihydro-1-ethyl-3,5,7-trimethyl-2H-azepine was transformed to its perchloric acid addition salt, presumed to be 3,4-dihydro-1-ethyl-3,5,7-trimethyl-2H-azepinium perchlorate, in the form of a white solid; M.P. 99–101° C.

Analysis.—Calcd. for C$_{11}$H$_{20}$ClNO$_4$: C, 49.71; H, 7.59; N, 5.27. Found: C, 50.33; H, 7.63; N, 5.66.

U.V. (absolute ethanol)—273 m$\mu$ ($\epsilon$=8,000).

I.R. (principal bands; mineral oil mull)—1675 and 1610 cm.$^{-1}$.

Using in place of perchloric acid, hydrochloric acid; hydriodic acid; sulfuric acid; trichloroacetic acid; and picric acid, there are obtained the corresponding hydrochloric; hydriodic; sulfuric; trichloroacetic; and picric acid addition salts, respectively, of 1,3-dihydro-1-ethyl-3,5,7-trimethyl-2H-azepine.

Following the procedures of Example 3 but substituting for the 1,3-dihydro-1,3,5,7-tetramethyl-2H-azepin-2-one,
1,3-dihydro-1-allyl-3,5,7-trimethyl-2H-azepin-2-one;
1,3-dihydro-1-cyclopentyl-3,5,7-trimethyl-2H-azepin-2-one;
1,3-dihydro-1-benzyl-3,7-diethyl-2H-azepin-2-one;
1,3-dihydro-1-(4-tert-butylcyclohexyl)-3,7-diisopropyl-2H-azepin-2-one;
1,3-dihydro-3,7-dipropyl-1-hexyl-2H-azepin-2-one; and
1,3-dihydro-1-(2-propynyl)-3,5,7-triethyl-2H-azepin-2-one, there are obtained 1,3-dihydro-1-allyl-3,5,7-trimethyl-2H-azepine;
1,3-dihydro-1-cyclopentyl-3,5,7-trimethyl-2H-azepine;
1,3-dihydro-1-benzyl-3,7-diethyl-2H-azepine;
1,3-dihydro-1-(4-tert-butylcyclohexyl)-3,7-diisopropyl-2H-azepine;
1,3-dihydro-3,7-dipropyl-1-hexyl-2H-azepine; and
1,3-dihydro-1-(2-propynyl)-3,5,7-triethyl-2H-azepine;

respectively, and their perchloric, hydrochloric, hydriodic, sulfuric, trichloroacetic, and picric acid addition salts.

Example 5.—1,3-dihydro-3,5,7-trimethyl-2H-azepine 1,3-dihydro-3,5,7-trimethyl-2H-azepin-2-one (15.1 g.; 0.10 mole) was added in four portions to a stirred slurry of lithium aluminum hydride (2.84 g.; 0.075 mole) in 150 ml. of anhydrous diethyl ether at about 25° C. during 10 minutes. The resulting mixture was refluxed with stirring for 3 hours while a slow stream of nitrogen was passed into the reaction flask. The reaction mixture was then cooled externally with ice and, with continued stirring, 3 ml. of water, 3 ml. of 25% aqueous sodium hydroxide solution, and 8 ml. of water were added in that order. Stirring was continued for about 5 minutes. The granular precipitate of aluminate salts was removed by filtration, and the filtrate was evaporated to give 1,3-dihydro-3,5,7-trimethyl-2H-azepine in the form of a very fluffy, white solid which appeared to be rather unstable.

Following the procedure of Example 3, 1,3-dihydro-3,5,7-trimethyl-2H-azepine is transformed to the corresponding perchloric acid and hydriodic acid addition salts.

Following the procedure of Example 5 but substituting for the 1,3-dihydro-3,5,7-trimethyl-2H-azepin-2-one;
1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin-2-one;
1,3-dihydro-3,7-diisobutyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one; and
1,3-dihydro-3,7-diisopropyl-5-methyl-2H-azepin-2-one, there are obtained 1,3-dihydro-3,7-dimethyl-2H-azepine;
1,3-dihydro-3,7-diethyl-2H-azepine;
1,3-dihydro-3,7-dipropyl-2H-azepine;
1,3-dihydro-3,7-diisopropyl-2H-azepine;
1,3-dihydro-3,7-diisobutyl-2H-azepine;
1,3-dihydro-3,5,7-triethyl-2H-azepine;
1,3-dihydro-3,7-diethyl-5-methyl-2H-azepine;
1,3-dihydro-3,7-dimethyl-5-ethyl-2H-azepine;
1,3-dihydro-5-tert-butyl-3,7-dimethyl-2H-azepine; and
1,3-dihydro-3,7-diisopropyl-5-methyl-2H-azepine, respectively.

Following the procedure of Example 3, each of the above listed 1,3-dihydro-2H-azepines is transformed to the corresponding perchloric, hydrochloric, hydriodic, sulfuric, trichloroacetic, and picric acid addition salts.

*Example 6.—Dimethyl 1,2,4,6-tetramethyl-2-azabicyclo-[3.2.2]nona-6,8-diene-8,9-dicarboxylate*

A solution of dimethyl acetylenedicarboxylate (7.1 g.; 0.05 mole) in 35 ml. of benzene was added in one portion at about 25° C. to a benzene solution (35 ml.) of 1,3-dihydro-1,3,5,7-tetramethyl-2H-azepine, prepared by reacting 1,3 - dihydro-1,3,5,7-tetramethyl-2H-azepin-2-one (8.3 g.; 0.05 mole) with lithium aluminum hydride (1.9 g.; 0.05 mole) according to the procedure of Example 3. After the vigorous exothermic reaction subsided, the mixture was allowed to stand at about 25° C. for 2 hours. The benzene was then evaporated at reduced pressure. The resulting dark oil was adsorbed on a 1000-g. column of Florisil (60–100 mesh; a magnesium trisilicate; obtained from the Floridin Company, Tallahassee, Fla), and was eluted with about 8 liters of a mixture of equal volumes of diethyl ether and hexane. The eluate was evaporated to give 6.9 g. of an orange oil which crystallized; M.P. 67–79° C. Recrystallization of this material from hexane gave dimethyl 1,2,4,6-tetramethyl-2-azabicyclo[3.2.2]nona-6,8-diene-8,9-dicarboxylate in the form of white prisms; M.P. 89.5–91° C.

*Analysis.*—Calcd. for $C_{16}H_{25}NO_4$: C, 65.06; H, 8.53; N, 4.74. Found: C, 65.37; H, 8.20; N, 4.87.

I.R. (principal bands; mineral oil mull)—1740 and 1715 cm.$^{-1}$.

Gradual addition of an ethereal solution of hydrogen chloride to an ethereal solution of dimethyl 1,2,4,6-tetramethyl - 2-azabicyclo[3.2.2]nona-6,8-diene-8,9-dicarboxylate until fresh additions no longer caused precipitation, followed by filtration, gave dimethyl-1,2,4,6-tetramethyl-2 - azabicyclo[3.2.2]nona-6,8-diene-8,9-dicarboxylate hydrochloride. When ethereal solutions of sulfuric acid, phosphoric acid, benzoic acid, or salicylic acid are used in place of ethereal hydrogen chloride, the corresponding sulfuric, phosphoric, benzoic, and salicylic acid addition salts are obtained.

*Example 7.—Diethyl 2-ethyl-1,4,6-trimethyl-2-azabicyclo[3.2.2]nona-6,8-diene-8,9-dicarboxylate*

Following the procedure of Example 6 but using the 1,3-dihydro-1-ethyl-3,5,7-trimethyl-2H-azepine obtained in Example 4 and an equimolecular amount of diethyl acetylenedicarboxylate in place of 1,3 - dihydro-1,3,5,7-tetramethyl-2H-azepine and dimethyl acetylenedicarboxylate, there was obtained diethyl 2-ethyl-1,4,6-trimethyl-2-azabicyclo[3.2.2]nona-6,8-diene-8,9-dicarboxylate.

Also following the procedure of Example 6, diethyl 2 - ethyl-1,4,6-trimethyl-2-azabicyclo[3.2.2]nona-6,8-diene-8,9-dicarboxylate hydrochloride was prepared.

*Example 8.—Dibutyl 1,4,6-trimethyl-2-azabicyclo[3.2.2]nona-6,8-diene-8,9-dicarboxylate*

Following the procedure of Example 6 but using the 1,3-dihydro-3,5,7-trimethyl-2H-azepine obtained in Example 5 and an equimolecular amount of dibutyl acetylenedicarboxylate in place of 1,3-dihydro-1,3,5,7-tetramethyl-2H-azepine and dimethyl acetylenedicarboxylate, there was obtained dibutyl 1,4,6-trimethyl-2-azabicyclo[3.2.2]nona-6,8-diene-8,9-dicarboxylate.

Also following the procedure of Example 6, dibutyl 1,4,6 - trimethyl-2-azabicyclo[3.2.2]nona-6,8-diene-8,9-dicarboxylate hydrochloride was prepared.

Following the procedure of Example 6 but substituting for dimethyl acetylenedicarboxylate;
diethyl acetylenedicarboxylate;
dipropyl acetylenedicarboxylate;
diisopropyl acetylenedicarboxylate;
dibutyl acetylenedicarboxylate;
diphenyl acetylenedicarboxylate;
and diisohexyl acetylenedicarboxylate, there are obtained diethyl 1,2,4,6-tetramethyl-2-azabicyclo[3.2.2]nona-6,8-diene-8,9-dicarboxylate;
dipropyl 1,2,4,6-tetramethyl-2-azabicyclo[3.2.2]nona-6,8-diene-8,9-dicarboxylate;
diisopropyl 1,2,4,6-tetramethyl-2-azabicyclo[3.2.2]nona-6,8-diene-8,9-dicarboxylate;
dibutyl 1,2,4,6-tetramethyl-2-azabicyclo[3.2.2]nona-6,8-diene-8,9-dicarboxylate;
dipentyl 1,2,4,6-tetramethyl-2-azabicyclo[3.2.2]nona-6,8-diene-8,9-dicarboxylate,
and diisohexyl 1,2,4,6-tetramethyl-2-azabicyclo[3.2.2]nona-6,8-diene-8,9-dicarboxylate, respectively. Also following the procedures of Example 6, each of the above 2-azabicyclo[3.2.2]nona-6,8-diene-8,9-dicarboxylic acid esters is transformed to the corresponding hydrochloric, sulfuric, phosphoric, benzoic, and salicylic acid addition salts.

Following the procedure of Example 6 but substituting for the 1,3-dihydro-1,3,5,7-tetramethyl-2H-azepin-2-one;
1,3-dihydro-3,7-dimethyl-2H-azepin-2-one;
1,3-dihydro-3,7-diethyl-2H-azepin-2-one;
1,3-dihydro-3,7-dibutyl-2H-azepin-2-one;
1,3-dihydro-3,5,7-triethyl-2H-azepin-2-one;
1,3-dihydro-5-tert-butyl-3,7-dimethyl-2H-azepin-2-one;
1,3-dihydro-1-isopropyl-3,5,7-trimethyl-2H-azepin-2-one;
1,3-dihydro-1-cyclopentyl-3,7-dimethyl-2H-azepin-2-one;
1,3-dihydro-1-allyl-3,7-diethyl-2H-azepin-2-one;
1,3-dihydro-1-(2-propynyl)-3,5,7-triethyl-2H-azepin-2-one;
1,3-dihydro-1-(2-methyl-2-butenyl)-3,5,7-trimethyl-2H-azepin-2-one;
1,3-dihydro-1-(3-pentynyl)-3,7-dimethyl-2H-azepin-2-one;
1,3-dihydro-1-benzyl-3,7-diethyl-5-methyl-2H-azepin-2-one; and
1,3-dihydro-1-(1-naphthylmethyl)-5-isobutyl-3,7-dimethyl-2H-azepin-2-one, there are obtained dimethyl 1,4-dimethyl-2-azabicyclo[3.2.2]nona-6,8-diene-8,9-dicarboxylate;
dimethyl 1,4-diethyl-2-azabicyclo[3.2.2]nona-6,8-diene-8,9-dicarboxylate;
dimethyl 1,4-dibutyl-2-azabicyclo[3.2.2]nona-6,8-diene-8,9-dicarboxylate;
dimethyl 1,4,6-triethyl-2-azabicyclo[3.2.2]nona-6,8-diene-8,9-dicarboxylate;
dimethyl 6-tert-butyl-1,4-dimethyl-2-azabicyclo[3.2.2]nona-6,8-diene-8,9-dicarboxylate;
dimethyl 2-isopropyl-1,4,6-trimethyl-2-azabicyclo[3.2.2]nona-6,8-diene-8,9-dicarboxylate;
dimethyl 2-cyclopentyl-1,4-dimethyl-2-azabicyclo[3.2.2]nona-6,8-diene-8,9-dicarboxylate;
dimethyl 2-allyl-1,4-diethyl-2-azabicyclo[3.2.2]nona-6,8-diene-8,9-dicarboxylate;
dimethyl 2-(2-propynyl)-1,4,6-triethyl-2-azabicyclo[3.2.2]nona-6,8-diene-8,9-dicarboxylate;
dimethyl 2-(2-methyl-2-butenyl)-1,4,6-trimethyl-2-azabicyclo[3.2.2]nona-6,8-diene-8,9-dicarboxylate;
dimethyl 2-(3-pentynyl)-1,4-dimethyl-2-azabicyclo[3.2.2]nona-6,8-diene-8,9-dicarboxylate;
dimethyl 2-benzyl-1,4-diethyl-6-methyl-2-azabicyclo[3.2.2]nona-6,8-diene-8,9-dicarboxylate; and
dimethyl 2-(1-naphthylmethyl)-6-isobutyl-1,4-dimethyl-2-azabicyclo[3.2.2]nona-6,8-diene-8,9-dicarboxylate, respectively. Also following the procedures of Example 6, each of the above 2-azabicyclo[3.2.2]nona-6,8-diene-8,9-dicarboxylic acid esters is transformed to the corresponding hydrochloric, sulfuric, phosphoric, benzoic, and salicylic acid addition salts.

I claim:
1. A compound of the formula:

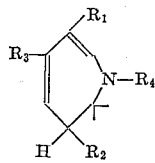

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive.

2. 1,3-dihydro-1,3,5,7-tetramethyl-2H-azepine.
3. 1,3-dihydro-1-ethyl-3,5,7-trimethyl-2H-azepine.
4. 1,3-dihydro-3,5,7-trimethyl-2H-azepine.
5. A process for the preparation of a 1,3-dihydro-2H-azepine of the formula:

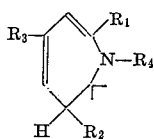

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, which comprises the steps, (1) mixing a compound of the formula:

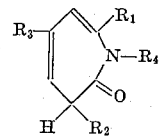

wherein $R_1$, $R_2$, $R_3$, and $R_4$ are as given above, with lithium aluminum hydride, and (2) mixing the reaction mixture from step (1) with water and a base to form said 1,3-dihydro-2H-azepine.

No references cited.

ALEX MAZEL, *Primary Examiner.*
ALTON D. ROLLINS, *Assistant Examiner.*

UNITED STATES PATENT OFFICE
CERTIFICATE OF CORRECTION

Patent No. 3,267,092                                August 16, 1966

Leo A. Paquette

It is hereby certified that error appears in the above numbered patent requiring correction and that the said Letters Patent should read as corrected below.

Column 2, lines 58 to 65, the formula should appear as shown below instead of as in the patent:

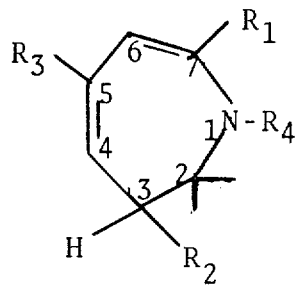

column 3, line 4, for "$R_5OOC-C=C-COOR_6$" read -- $R_5OOC-C{\equiv}C-COOR_6$ ; same column 3, lines 68 to 75, the formula should appear as shown below instead of as in the patent:

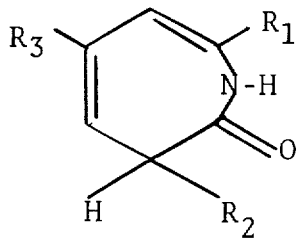

column 15, lines 3 to 9, the formula should appear as shown below instead of as in the patent:

3,267,092

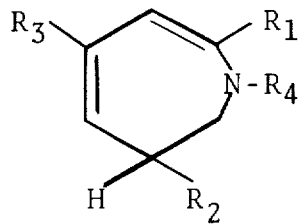

Signed and sealed this 12th day of September 1967.

(SEAL)
Attest:

ERNEST W. SWIDER  
Attesting Officer

EDWARD J. BRENNER  
Commissioner of Patents